Patented July 19, 1949

2,476,529

UNITED STATES PATENT OFFICE 2,476,529

ORGANOHALOSILANES

Arthur J. Barry, Midland, Mich., assignor to The Dow Chemical Company, Midland, Mich., a corporation of Delaware No Drawing. Application August 15, 1946,
Serial No. 690,831

5 Claims. (Cl. 260—448.2)

This invention concerns certain new organohalosilanes, and a method of making them.

The organohalosilanes provided by the invention are liquid higher alkyl dihalosilanes having the general formula:

wherein R represents an alkyl radical containing at least 10, and preferably from 10 to 20, carbon atoms and X represents a halogen atom.

These compounds contain two different kinds of readily replaceable groups in the molecule, namely the halogen atoms and the hydrogen. The compounds may be reacted with an alcohol to cause displacement of the halogen atoms by alkoxy groups with formation of the corresponding monoalkyl dialkoxysilanes. The compounds of this invention may also be hydrolyzed with concurrent condensation of the hydrolysis products to form either cyclic or linear organosiloxanes containing in the molecule silicon atoms having alkyl radicals and hydrogen atoms attached thereto.

Subsequent to such hydrolysis and condensation reactions, the hydrogen atoms remaining attached to the silicon atoms may, under mild oxidizing conditions, be displaced by oxygen with resultant formation of further oxygen linkages, or bridges between the silicon atoms. In this way, resinous polymers of very high molecular weight may be built up in a step-wise manner as desired.

The higher alkyl dihalosilanes of this invention are also useful as agents which may be applied to solid hydrophilic materials such as wood, glass, cotton, wool, etc., to render the normally hydrophilic materials repellent to water. Apparently such treatment involves the formation of a water-repellent film at the surface of the normally hydrophilic material, but such film is usually too thin to be visible. Often such film on a hydrophilic base member serves as an excellent support for the subsequent application and bonding of lacquers, paints, or other coating materials to the base member. The higher alkyl dihalosilanes are also useful as boundary lubricants.

The higher alkyl dihalosilanes may be conveniently prepared by reacting a higher alkyl magnesium halide with a molecular equivalent or more, e. g. from 1 to 5 molecular equivalents, of a trihalosilane in the presence of an ether as a reaction medium. Examples of higher alkyl magnesium halides which may be used in the process are decyl magnesium chloride, decyl magnesium bromide, lauryl magnesium chloride, lauryl magnesium bromide, tetradecyl magnesium chloride, tetradecyl magnesium bromide, hexadecyl magnesium chloride, hexadecyl magnesium bromide, stearyl magnesium chloride, stearyl magnesium bromide, eicosyl magnesium chloride, eicosyl magnesium bromide, myricyl magnesium chloride, etc. Trichlorosilane is preferably employed as the trihalosilane starting material but trifluorosilane or tribromosilane may, though less conveniently, be used. Any of the ethers ordinarily employed in carrying out Grignard reactions, e. g. dimethyl ether, diethyl ether, dipropyl ether, dibutyl ether, methylethyl ether, etc., may be used.

The reaction between a Grignard reagent and a trihalosilane occurs readily and with the evolution of a considerable amount of heat. Even when using a molecular excess of the trihalosilane over the Grignard reagent, a minor amount of a dialkyl halosilane is usually formed together with the desired monoalkyl halosilane. The yields of the monoalkyl halosilane product are usually highest when the reaction is carried out at room temperature or below, e. g. at from 0° to 10° C. but it may be carried out at higher temperatures if desired. In practice, an ethereal solution of the Grignard reagent is preferably added in drop-wise manner to an ethereal solution of the trihalosilane while stirring and cooling the mixture at temperatures of from 0° to −70° C. After adding the Grignard reagent, the mixture is usually permitted to stand, with continued stirring, while the temperature rises to room temperature. The mixture may thereafter be warmed under reflux for a half hour or more in order to assure substantially complete reaction.

During the reaction, a magnesium halide is formed and is usually precipitated as a salt layer. After completion of the reaction, the ethereal solution of the organosilicon halide is separated from the precipitate, e. g. by distillation, decantation, or filtration, and fractionally distilled to remove the ether and separate the monoalkyl dihalosilane.

The following examples will serve to illustrate the invention, but are not to be construed as limiting its scope:

Example 1

A Grignard reagent was formed from 820 grams of a mixture of lauryl and tetradecyl chlorides (prepared from Lorol, i. e. technical lauryl alcohol) by slowly adding an ethereal solution of the chlorides to 120 grams of magnesium turnings. The resultant product containing the corresponding mixed higher alkyl magnesium chlorides was added gradually and with stirring to a solution of 950 grams of trichlorosilane in diethyl ether while cooling the reaction mixture in an ice bath. When the addition was complete, the mixture was allowed to stand for several hours after which it was filtered and fractionally distilled.

As the fraction distilling at temperatures between 156° and 158° C. at 15 millimeters absolute pressure there was obtained 274 grams (1.02 gram moles) of lauryl dichlorosilane. The product is a colorless liquid having an index of refraction, $N_D^{20}$, of 1.4516, and a specific gravity, $d_{20}^{20}$ of 0.971.

As the fraction distilling at temperatures between 142° and 146° C. at 2 millimeters absolute pressure there was obtained 106 grams (0.36 gram mole) of tetradecyl dichlorosilane. The compound is a colorless liquid, having an index of refraction, $N_D^{20}$, of 1.4540, and a specific gravity, $d_{20}^{20}$ of 0.940.

Example 2

Stearyl dichlorosilane was prepared by reacting an ethereal solution of 3.3 gram moles of stearyl magnesium bromide with approximately 10 gram moles of trichlorosilane in benzene, while cooling the reaction mixture in an ice bath. The resultant product was filtered and the solvents and unreacted trichlorosilane were removed by distillation.

Stearyl dichlorosilane was obtained as an orange colored liquid product, having a specific gravity, $d_{20}^{20}$ of 0.935, and an index of refraction, $N_D^{20}$, of 1.4603. After standing for 8 months, the product became colorless.

By procedure similar to that described in the examples given above, decyl magnesium chloride may be reacted with trichlorosilane to give decyl dichlorosilane; decyl magnesium bromide may be reacted with tribromosilane to produce decyl dibromosilane; dodecyl magnesium bromide may be reacted with tribromosilane to give dodecyl dibromosilane; hexadecyl magnesium chloride may be reacted with trichlorosilane to give hexadecyl dichlorosilane; stearyl magnesium bromide may be reacted with tribromosilane to give stearyl dibromosilane; eicosyl magnesium chloride may be reacted with trichlorosilane to produce eicosyl dichlorosilane; myricyl magnesium bromide may be reacted with trichlorosilane to give myricyl dichlorosilane, etc.

This application is a continuation-in-part of my copending application, Serial No. 556,913, filed October 2, 1944, now abandoned.

Other modes of applying the principles of the invention may be employed instead of those explained, change being made as regards the products herein disclosed, provided the compound or compounds stated by any of the following claims or equivalent of such stated compound or compounds be employed.

I therefore point out and distinctly claim:

1. A higher alkyl dihalosilane having the general formula:

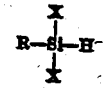

wherein R represents an alkyl radical containing from 10 to 20 carbon atoms and X represents a halogen atom.

2. A higher alkyl dichlorosilane having the general formula:

wherein R represents an alkyl radical containing from 10 to 20 carbon atoms.

3. Mono-lauryl dichlorosilane, a liquid compound which boils at approximately 156° to 158° C. at 15 millimeters pressure.

4. Tetradecyl dichlorosilane, a liquid compound which boils at approximately 142° to 146° C. at 2 millimeters pressure.

5. Liquid mono-stearyl dichlorosilane, having a specific gravity, $d_{20}^{20}$ of approximately 0.935, and an index of refraction, $N_D^{20}$, of approximately 1.4603.

ARTHUR J. BARRY.

REFERENCES CITED

The following references are of record in the file of this patent:

UNITED STATES PATENTS

| Number | Name | Date |
| --- | --- | --- |
| 2,129,281 | Lincoln et al. | Sept. 6, 1938 |
| 2,258,218 | Rochow | Oct. 7, 1941 |
| 2,286,763 | Rochow | June 16, 1942 |
| 2,375,007 | Larsen et al. | May 1, 1945 |
| 2,380,998 | Sprung | Aug. 7, 1945 |
| 2,386,259 | Norton | Oct. 9, 1945 |